United States Patent
Kaufman (10) Patent No.: US 11,190,886 B2
(45) Date of Patent: Nov. 30, 2021

(54) MAGNETIC BATTERY COVER FOR A HEARING DEVICE

(71) Applicant: BLAMEY & SAUNDERS HEARING PTY LTD, East Melbourne (AU)

(72) Inventor: Yaniv Eliezer Kaufman, East Melbourne (AU)

(73) Assignee: Sonova AG, Staefa (CH)

(*) Notice: Subject to any disclaimer, the term of this patent is extended or adjusted under 35 U.S.C. 154(b) by 0 days.

(21) Appl. No.: 16/482,480

(22) PCT Filed: Jan. 31, 2018

(86) PCT No.: PCT/AU2018/050058
§ 371 (c)(1),
(2) Date: Jul. 31, 2019

(87) PCT Pub. No.: WO2018/141010
PCT Pub. Date: Aug. 9, 2018

(65) Prior Publication Data
US 2020/0007997 A1 Jan. 2, 2020

(30) Foreign Application Priority Data
Jan. 31, 2017 (AU) .................. 2017900266

(51) Int. Cl.
*H04R 25/00* (2006.01)
*B33Y 80/00* (2015.01)
*B33Y 50/00* (2015.01)

(52) U.S. Cl.
CPC .......... *H04R 25/602* (2013.01); *B33Y 80/00* (2014.12); *H04R 25/609* (2019.05); *B33Y 50/00* (2014.12);
(Continued)

(58) Field of Classification Search
None
See application file for complete search history.

(56) References Cited

U.S. PATENT DOCUMENTS 5,675,657 A 10/1997 Giannetti
8,139,800 B2 3/2012 Ho
(Continued)

FOREIGN PATENT DOCUMENTS

CN 201774768 3/2011
CN 205595379 9/2016
(Continued)

OTHER PUBLICATIONS

International Search Report received in PCT Patent Application No. PCT/AU2018/050058, dated Apr. 18, 2018.

*Primary Examiner* — Walter F Briney, III
(74) *Attorney, Agent, or Firm* — ALG Intellectual Property, LLC (57) ABSTRACT

A hearing device comprises a device body carrying a hearing device processor for processing microphone signals to produce an output acoustic signal for delivery to a respective ear of a user. A battery compartment is provided for containing a battery to power the processor, the battery compartment bearing at least two magnets, or magnetic restraint elements. A battery cover bearing at least two magnets respectively configured to magnetically cooperate with the at least two battery compartment magnets in order to magnetically hold the battery cover against the battery compartment so as to define a battery cavity between the battery cover and the battery compartment. The magnets are positioned about the battery cavity so as to magnetically urge the battery cover to a preferred position relative to the battery compartment.

17 Claims, 9 Drawing Sheets

(52) U.S. Cl.
CPC ........ *H04R 25/603* (2019.05); *H04R 2225/31* (2013.01); *H04R 2225/61* (2013.01); *H04R 2225/77* (2013.01)

(56) References Cited

U.S. PATENT DOCUMENTS

| | | | |
|---|---|---|---|
| 2008/0199031 A1* | 8/2008 | David Ho | H04R 25/602 381/322 |
| 2012/0093349 A1* | 4/2012 | Chua | H04R 25/602 381/323 |
| 2015/0350797 A1* | 12/2015 | Muller | H04R 25/602 381/323 |
| 2017/0093079 A1* | 3/2017 | Wagman | H02J 7/0044 |
| 2018/0085993 A1* | 3/2018 | Biskop | B33Y 70/00 |
| 2018/0206884 A1* | 7/2018 | Beaupre | A61B 17/3476 |

FOREIGN PATENT DOCUMENTS

| | | |
|---|---|---|
| WO | 2011159349 | 12/2011 |
| WO | 2013188902 | 12/2013 |

* cited by examiner

MAGNETIC BATTERY COVER FOR A HEARING DEVICE

CROSS-REFERENCE TO RELATED APPLICATIONS

This application claims the benefit of Australian Provisional Patent Application No. 2017900266 filed 31 Jan. 2017, which is incorporated herein by reference.

TECHNICAL FIELD

The present invention relates to a method and device for incorporating a replaceable battery in a hearing device. In particular the present invention provides a battery compartment using magnets to ease the task of removing and replacing the replaceable battery.

BACKGROUND OF THE INVENTION

Hearing devices such as hearing aids and assistive listening devices (ALDs) are typically designed with a device lifetime of about 5 years. With device miniaturisation very limited space is available for a battery to power the device. Rechargeable batteries which are small enough for use in hearing devices only have sufficient power for about one or two days of device operation, and typically can only be recharged about 500 times. Accordingly, a single rechargeable battery is not sufficient to power the device for 5 years. Providing a hearing device with a "built-in" battery thus involves sacrificing most of the device life purely because of battery lifetime limitations, or at least requires that the device be returned to the supplier for mechanical dismantling, battery replacement, and reconstruction about every year.

An alternative is to provide the hearing device with a battery compartment which can be accessed by the user. The battery compartment may hold either a rechargeable battery or a single-use replaceable battery. In this approach the hatch of the battery compartment is an extremely small moving part. Consequently, the hatch is fragile. This leads to a relatively high volume of mechanical repairs, particularly to the hatch of the battery compartment, leading to the same result in that the device often needs to be returned to the supplier before expiry of the device lifetime.

In a battery drawer design the battery needs to be enclosed by a minimal plastic "shell" which goes in and out of the hearing device. A battery drawer is thus prone to breaking. This is due to the drawer's minimal plastic "shell" which is made very thin to minimise the amount of space it occupies. Moreover, the mechanical aspect of the drawer exposes it to damage from wear and tear during opening and closing of the drawer.

Furthermore, a battery drawer design imposes a restriction on the location of the battery compartment as it needs to be accessible from the surface. In addition, a battery drawer has very precise tolerance on the dimensions of the components; this can result in complications during manufacturing. The drawer should clearly be smaller than the opening but not too small so as to leave a big gap. Even more importantly the tolerance is even smaller for the closing (locking) mechanism as well as the mechanism that holds the drawer in place. If these components are not within tolerances (sometimes less than 0.012 mm) the drawer could potentially swing open when the device is moved, not close properly (or at all), or not fit within the opening at all.

The battery hatch, the battery drawer shell, and the battery itself are all very small parts which, in addition to their fragility, makes them very difficult for the user to manipulate with fingers alone.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In this specification, a statement that an element may be "at least one of" a list of options is to be understood that the element may be any one of the listed options, or may be any combination of two or more of the listed options.

SUMMARY OF THE INVENTION

According to a first aspect the present invention provides a battery cover for a hearing device, the battery cover comprising:

at least two cover restraint elements, the cover restraint elements configured to magnetically cooperate with at least two respective battery compartment restraint elements in order to magnetically hold the battery cover against the battery compartment so as to define a battery cavity between the battery cover and the battery compartment, wherein the cover restraint elements are positioned about the battery cavity so as to magnetically urge the battery cover to a preferred position relative to the battery compartment, and wherein at least one of the cover restraint elements and body restraint elements comprises a permanent magnet.

According to a second aspect the present invention provides a hearing device comprising:

a device body carrying a hearing device processor for processing microphone signals to produce an output acoustic signal for delivery to a respective ear of a user, a battery compartment for containing a battery to power the processor, and battery compartment bearing at least two battery compartment restraint elements; and a battery cover bearing at least two cover restraint elements respectively configured to magnetically cooperate with the at least two battery compartment restraint elements in order to magnetically hold the battery cover against the battery compartment so as to define a battery cavity between the battery cover and the battery compartment, wherein the cover restraint elements are positioned about the battery cavity so as to magnetically urge the battery cover to a preferred position relative to the battery compartment, and wherein at least one of the cover restraint elements and body restraint elements comprises a permanent magnet.

In some embodiments of the invention, the battery compartment and the battery cover each comprise two restraint elements. Any suitable subset of the restraint elements may comprise permanent magnets, or all of the restraint elements may comprise permanent magnets. It is to be appreciated that wherever the following discussion uses the term "magnet", but where it is evident that an alternative restraint element could be provided such as an iron or steel plate or any such magnetically responsive element, then all such alternatives are within the scope of the present invention.

In some embodiments the permanent magnet restraint elements may be mounted such that a magnetic alignment of the permanent magnet restraint elements enforces correct alignment of the cover against the hearing device body when the battery cover is in place.

The use of four or more magnets to fix the relative position of the battery cover and battery compartment is a notable element of the above-described aspects of the present invention, and in various embodiments this configuration may provide one or more benefits. For example, this configuration provides a magnetic resistance to incorrect rotational positions of the cover relative to the compartment: there is only two, and possibly only one rotational position of the cover, being the correct position(s), in which the magnets will not urge a change to the rotational position of the cover. The cover will thus tend to snap or twist under magnetic forces into the correct position relative to the compartment whenever the cover is brought close to the compartment even if in an initially incorrect rotational position. This auto-alignment aspect of the magnetic configuration of the present invention is particularly advantageous for people with lower dexterity such as the elderly who tend to be a large user group of hearing aids. Moreover, hearing aid chips are very expensive and can be sensitive if exposed to certain voltages under certain circumstances. By having different alignment of the magnets the design prevents the users from connecting the two parts in an incorrect orientation.

Moreover, auto-alignment of the cover relative to the body obviates the need for visual indicia of proper alignment, as such indicia if present are necessarily very small due to the typical device size. Instead, even without any such indicia, the cover and the body in such embodiments of the present invention will simply auto-align under the magnetic attraction of the magnets irrespective of whether the user can see what the correct alignment should be. This is thus particularly advantageous for people with poor eyesight such as the elderly who tend to be a large user group of hearing aids, and is also particularly advantageous for all users when interchanging batteries or modules in poorly lit environments which is often required given the wide variety of environments in which hearing aids are required such as cinemas or theatres.

The magnets may in some embodiments be mounted with differing polarity, such as opposite polarity, so that a magnetic axis of a first magnet on the battery compartment is not parallel nor rotationally symmetrical with (but may be anti-parallel with) a magnetic axis of a second magnet on the battery compartment. Such embodiments ensure that the auto-alignment characteristic of the magnet pairs can draw the cover into only one position against the body, instead of two positions as is possible if the magnet polarities are the same. In such embodiments, the auto-alignment characteristic of the magnet pairs being able to draw the cover into only one position against the body further permits simplification of device design, as there is no need for additional external mechanical elements to prevent incorrect connection.

The net holding force with which the battery cover is held onto the battery compartment can in some embodiments be effected by magnets of equal strength. Alternatively, in some embodiments, unequal magnetic strength may be provided between, on the one hand, a weaker first pair of magnets on a first side of the battery cavity and, on the other hand, a stronger second pair of magnets on a second side of the battery cavity, each pair comprising one cover magnet and one compartment magnet. Such embodiments will give rise to a magnetic hinging force on the battery cover during removal and replacement of the battery cover. Such embodiments may further comprise a fingernail catch, or any suitable user grip, provided proximal to the weaker first pair of magnets so as to preferentially give rise to a magnetically hinged opening motion of the battery cover. Magnetic hinging as used here refers to the imbalanced magnetic forces and does not imply the presence of any mechanical hinge; the battery cover in most embodiments will be physically detachable from the battery compartment, with the described magnetic hinging being on optional mode of use.

Accordingly, in a third aspect, the present invention provides a method of hinging open a battery cover of a hearing aid, the method comprising:

separating a first pair of magnets, of at least two pairs of magnets holding together a battery cover and a battery compartment, while allowing a second pair of magnets to continue to hold the cover and compartment together.

The hinged opening motion of the battery cover may be continued until the battery cover has hinged open by 180 degrees, so as to bring the second pair of magnets alongside each other in an anti-parallel configuration in which they continue to attract. The hinging motion is thus bistable, between a stable closed position and a stable 180 degrees opened position.

The magnetic hinging motion may be assisted by providing the first pair of magnets with weaker magnetic strength than the second pair of magnets. However, in alternative embodiments the hinging motion may be effected with equal-strength magnet pairs due to the weakening of the magnetic attraction of the first pair with increasing distance of separation, and/or due to provision of a user grip such as a fingernail edge proximal to the first pair.

Additionally or alternatively, in some embodiments, unequal magnetic strength may be effected between at least one magnet on the battery compartment and at least one magnet on the battery cover. Such embodiments thereby facilitate a process for removing a battery from the battery compartment, whereby a magnet of the battery cover can be used to draw the battery out of the battery cavity of the battery compartment, and to reposition the battery into a magnetically stable position against a magnet of the battery compartment on a rim of the battery cavity. In such embodiments, the at least one magnet on the battery compartment is preferably stronger than the at least one magnet on the battery cover, so that the battery is preferentially magnetically held onto the rim of the battery compartment by the battery compartment magnet when the battery cover is taken away. This configuration is desirable as it allows the user to hold the hearing aid and battery compartment in one hand throughout the entire process of replacing a battery, without needing to put down the hearing aid in order to use both hands to remove the battery from the battery cover. This also reduces the risk of losing the battery or the components of the device. However alternative embodiments may provide that the at least one magnet on the battery compartment is weaker than the at least one magnet on the battery cover, so that the battery is preferentially magnetically held onto the battery cover when the battery cover is taken away.

Thus, according to a fourth aspect the present invention provides a method for removing a hearing device battery, the method comprising:

drawing a battery out of a battery compartment of the hearing device, using a magnet of a battery cover; and repositioning the battery into a magnetically stable position against a magnet of the battery compartment.

In some embodiments, unequal magnetic strength is provided in both of the aspects described above, for example by providing first and second magnets on the battery compartment of substantially equal first strength, and providing third and fourth magnets on the battery cover of respective third and fourth strengths, wherein the first strength is greater than the third strength, and the third strength is greater than the fourth strength.

By choosing the aforementioned configuration of magnets a hinge is achieved without the complicated mechanical design of a standard mechanical hinge. Namely, the hinge is magnetically effected, without moving parts, which greatly simplifies the design for manufacturing of the device. This is one example, however, other benefits described in this invention are achieved using complicated mechanical design and fine tolerance of plastic in other hearing aids. Moreover, the applications described above could have been achieved in other ways using moving parts. However, the use of the magnets in the mentioned configuration achieves the required functionality without the use of moving parts and therefore improves the reliability and longevity of the device. Still further, these embodiments can improve manufacturability. In particular, the use of magnets with varying magnetic strength could be used to improve manufacturing processes. As an example by selecting magnets with varying magnetic strength in a jig the module can be anchored at two points but lifted easily in a rotational motion.

The battery compartment magnets may be on the contact surface, or rim, of the battery compartment which contacts the battery cover when in place. Alternatively, the battery compartment magnets may be concealed beneath the rim of the battery compartment. Similarly, the cover magnets may be on the contact surface, or rim, of the battery cover which contacts the battery compartment when in place. Alternatively, the battery cover magnets may be concealed beneath the rim of the battery cover. The battery compartment rim and the battery cover rim when brought together preferably seal the battery cavity so as to exclude dust, hair, oils and the like.

In some embodiments of the invention, the battery compartment itself is a separate module to a body of the hearing aid device, and is magnetically held to the body of the hearing aid by at least one battery compartment mounting magnet and at least one hearing aid body magnet. In such embodiments a magnetic force holding the battery compartment to the hearing aid body preferably is greater than the magnetic force holding the battery cover to the battery compartment, so that removal of the battery cover does not also result in removal of the battery compartment module from the hearing aid body. In such embodiments, two pairs of magnets may be provided in order to hold the battery compartment to the hearing aid device body, and each pair may be configured with differing or opposite polarity in order to provide an auto-alignment of the battery compartment upon the hearing aid device body. Such embodiments may be particularly useful in enabling the hearing aid body to instead be interfaced with an alternative module such as a data and power cable connector, via magnetic attraction.

In alternative embodiments the battery compartment may be integrally formed with the hearing aid device body.

Thus, the various described embodiments of the invention recognise that some or many uses of the modular device can be simplified by the use of appropriately configured magnets, thus reducing dependency on visual indicia or user training by way of written user guides and the like. Instead, the described embodiments of the invention provide one or more of these various advantages by providing a configuration of magnets which make it strongly likely that the device is used correctly with minimal dependency on the way the device is attempted to be used.

According to a fifth aspect the present invention provides a non-transitory computer readable medium for three-dimensional printing of a hearing device battery cover, comprising instructions making up a digital blueprint file which, when executed by one or more processors, causes performance of the following:

three-dimensional printing of a battery cover including mounts for at least two cover restraint elements so that upon mounting of cover restraint elements the cover restraint elements will magnetically cooperate with at least two respective battery compartment restraint elements in order to magnetically hold the battery cover against the battery compartment so as to define a battery cavity between the battery cover and the battery compartment, wherein the mounts for the cover restraint elements are positioned about the battery cavity so that upon mounting of cover restraint elements the cover restraint elements will magnetically urge the battery cover to a preferred position relative to the battery compartment.

According to a sixth aspect the present invention provides a battery cover for a hearing device, the battery cover comprising:

at least one cover restraint element, the cover restraint element configured to magnetically cooperate with a body restraint element in order to magnetically hold the battery cover against the hearing device so as to define a battery compartment between the battery cover and the hearing device body, wherein at least one of the cover restraint element and body restraint element comprises a permanent magnet;

at least one battery control magnet, the battery control magnet mounted upon the battery cover such that a battery is magnetically repelled by the battery control magnet when the battery is inside the battery cover, and such that a battery is magnetically attracted to the battery control magnet when the battery is outside the battery cover.

According to a seventh aspect the present invention provides a method for removing a hearing device battery, the method comprising:

removing a battery cover from a hearing device, by overcoming a magnetic restraint holding the cover in place, while a battery control magnet of the battery cover repels the battery and urges the battery to remain in place within or upon the hearing device body;

rotating the battery cover and presenting an outside surface of the cover to the battery, so that the battery control magnet of the battery cover attracts the battery; and withdrawing the battery cover and battery from the hearing device body.

According to an eighth aspect the present invention provides a method for replacing a hearing device battery, the method comprising:

presenting an outside surface of the cover to the battery, so that a battery control magnet of the battery cover attracts the battery;

presenting the cover and battery to a hearing device body so as to position the battery within or upon the hearing device body;

dislodging the cover from the battery while leaving the battery within or upon the hearing device body;

rotating the cover and presenting the cover to the hearing device body so as to establish a magnetic restraint which holds the cover in place while the battery control magnet repels the battery and urges the battery to remain in place within or upon the hearing device body.

According to a ninth aspect the present invention provides a hearing device comprising:

a device body carrying a hearing device processor for processing microphone signals to produce an output acoustic signal for delivery to a respective ear of a user, the device body bearing at least one body restraint element; and a battery cover according to the first aspect;

wherein at least one of the body restraint element and the cover restraint element is a permanent magnet, and wherein the body restraint element and the cover restraint element are configured to magnetically cooperate in order to releasably hold the battery cover against the device body.

According to a tenth aspect the present invention provides a non-transitory computer readable medium for three-dimensional printing of a hearing device battery cover, comprising instructions making up a digital blueprint file which, when executed by one or more processors, causes performance of the following:

three-dimensional printing of a battery cover configured to carry at least one cover restraint element, the cover restraint element configured to magnetically cooperate with a body restraint element in order to magnetically hold the battery cover against the hearing device so as to define a battery compartment between the battery cover and the hearing device body, wherein at least one of the cover restraint element and body restraint element comprises a permanent magnet;

three-dimensional printing of a mount for at least one battery control magnet upon or within the battery cover, the battery control magnet mounted upon the battery cover such that a battery is magnetically repelled by the battery control magnet when the battery is inside the battery cover, and such that a battery is magnetically attracted to the battery control magnet when the battery is outside the battery cover.

Notably, the present invention thus envisages an arrangement in which the battery cover is attached to and detached from the hearing device body separately to the attachment/insertion and detachment/removal of the battery. In particular, when removing the battery from the hearing device, the battery cover is removed first, and then the battery is removed next. When inserting the battery, the battery is inserted first, and then the cover is placed.

Some embodiments of the first through tenth aspects of the present invention may further comprise a battery holding magnet upon the battery compartment, the battery holding magnet configured to hold the battery within the battery cavity. In such embodiments, the battery holding magnet preferably exerts a weaker force upon the battery than the battery control magnet or other magnet used to remove the battery, so that the battery can be withdrawn from the battery compartment by the force of the battery control magnet or the like overcoming the force of the battery holding magnet.

In some embodiments of the sixth through tenth aspects of the invention, the outside surface of the battery cover comprises a concavity which functions as a battery stabiliser to stabilise the battery when the battery is held against the outside of the cover under the attraction of the battery control magnet.

Alternative embodiments of the sixth through tenth aspects of the invention may mount the restraint elements so that the battery cover alignment upon the battery compartment is rotation insensitive and so that the cover may be held against the hearing device body in any one of a plurality of possible rotational positions. In all such embodiments the permanent magnet restraint elements are preferably mounted so that the desired magnetic effect of the battery control magnet upon the battery is achieved despite the presence of the permanent magnet restraint elements.

In some embodiments of the invention, the hearing device is a hearing aid. In other embodiments, the hearing device is an assistive listening device (ALD).

BRIEF DESCRIPTION OF THE DRAWINGS

An example of the invention will now be described with reference to the accompanying drawings, in which.

DESCRIPTION OF THE PREFERRED EMBODIMENTS

Figure 1:
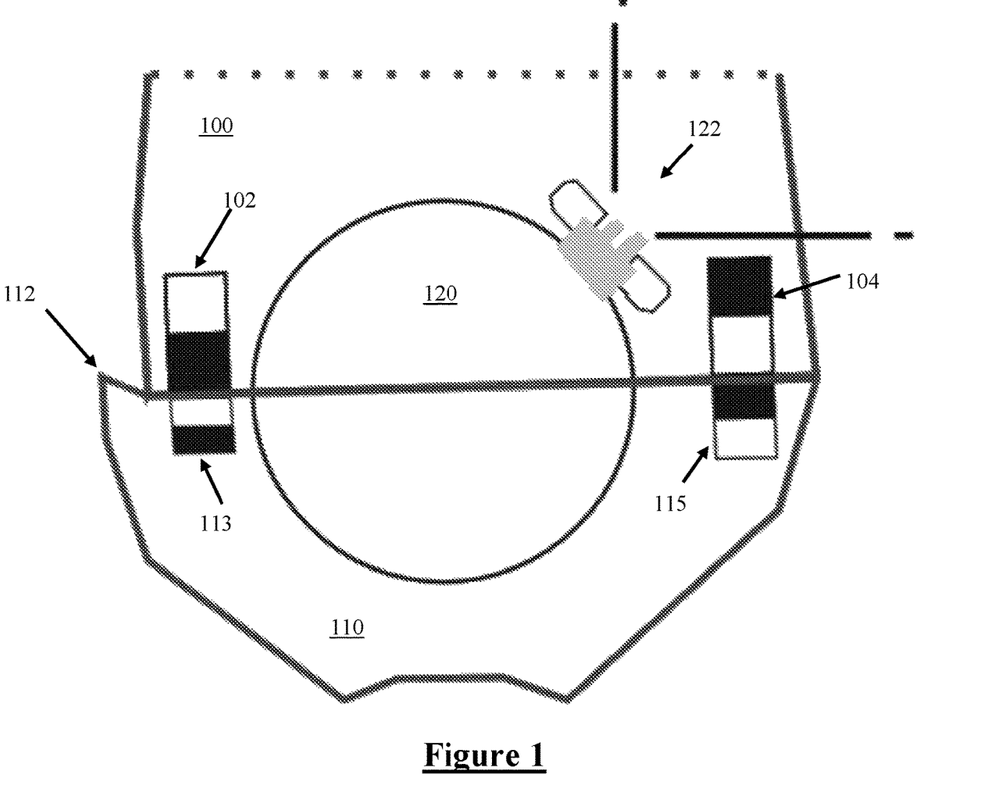
FIG. 1 is a cross sectional view of a battery cover and battery compartment in accordance with a first embodiment of the present invention.

FIG. 1 is a cross sectional view of a battery cover 110 and battery compartment 100 in accordance with a first embodiment of the present invention. The described embodiments provide a magnetic replaceable battery compartment for a hearing aid. More specifically, a modular battery case to store and facilitate connection between the hearing aid and a replaceable battery is presented. The compartment 100 and cover 110 are held together by magnets 102, 104, 113, 115. Throughout the drawings, for illustrative purposes, permanent magnets are depicted using black fill for the magnetic north end of the magnet and white fill for the magnetic south end of the magnet. Alternative embodiments may equivalently or similarly reverse the polarity of all or some of the magnets shown, and/or may replace a suitable subset of the described permanent magnets with any suitable magnetic restraint element such as a steel plate.

The compartment 100 and cover 110 together define a circular battery cavity to hold a suitable battery so as to provide electrical power to the hearing aid circuitry. In accordance with the present invention the compartment 100 also allows for easy access to replace the battery once it has discharged. Notably, this design improves on existing battery compartment designs by simplifying the compartment opening mechanism, improving robustness and longevity of the battery compartment, increasing battery usability and freeing up space and design freedom within the hearing aid.

The battery cavity is formed by the compartment 100 and battery cover 110. The compartment 100 and cover 110 are held together by magnetic attraction between two pairs of permanent magnets, the first pair comprising magnets 102 and 113, and the second pair comprising magnets 104 and 115. The first magnet pair 102, 113 has reverse polarity to the second magnet pair 104, 115, so that the cover 110 self-aligns and so as to guide correct mating with the compartment 100, as well as to use magnetic repulsion to prevent incorrect mating if the cover 110 is introduced in the opposite alignment to that shown with magnet 115 proximal to magnet 102.

FIG. 1 shows the cover 100 held in place during normal hearing aid operation, with the constant attractive force provided by magnets 102, 104, 113 and 115 combining to ensure that the battery 120 maintains constant firm contact with the electrical contacts indicated generally at 122 to power the hearing aid. Contacts 122 may take any suitable form and may pass power to circuitry of the hearing aid using any suitable layout, and are not described further.

Figure 2A:
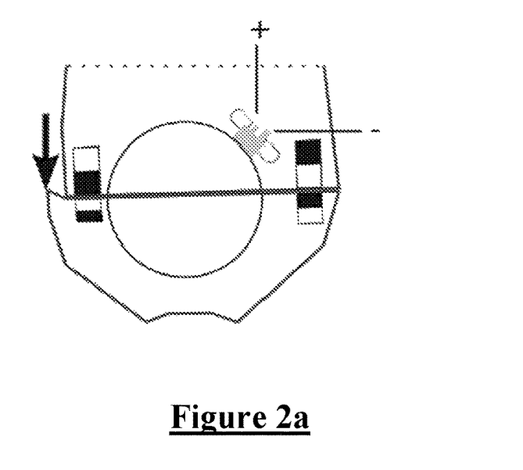
FIGS. 2a-2f illustrate a process for magnetically hinging open the battery cover of FIG. 1.
Figure 2B:
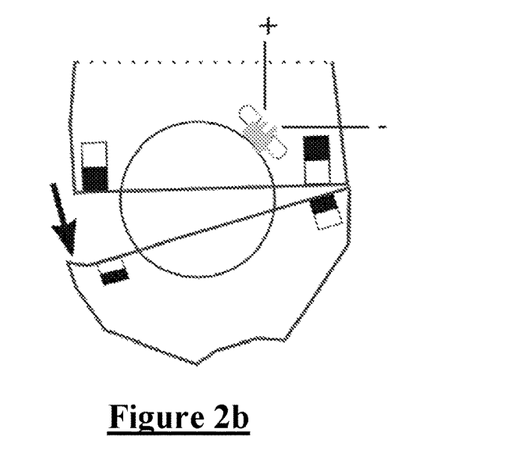
Figure 2C:
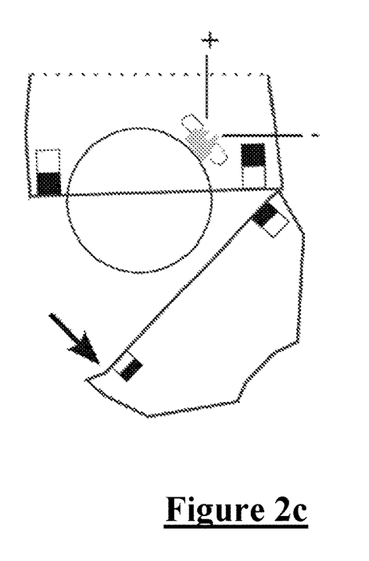
Figure 2D:
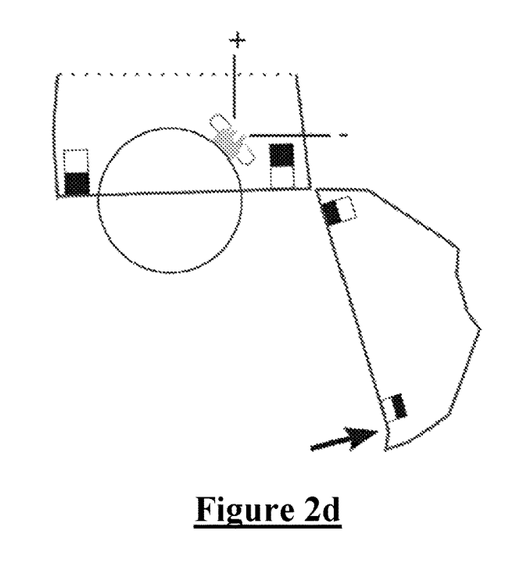
Figure 2E:
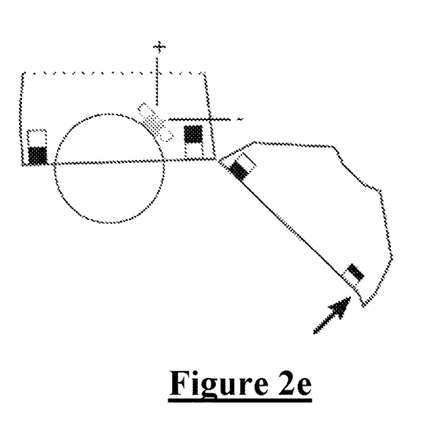
Figure 2F:
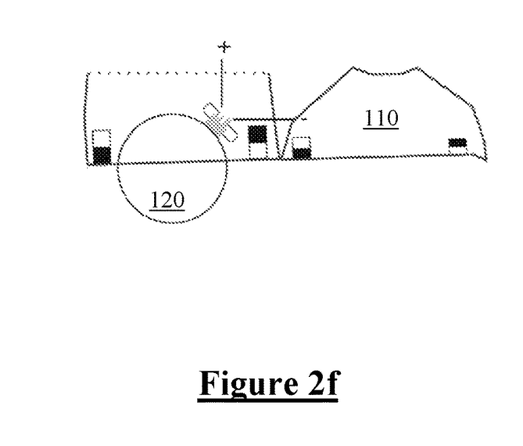

FIGS. 2a-2f illustrate a process for magnetically hinging open the battery cover of FIG. 1. A fingernail edge 112 is provided on the cover 110, adjacent to the first magnet pair 104, 113, and opposite the second magnet pair 104, 115. Further, the magnetic strength of the magnets is configured so that the magnets 102 and 104 are of a first magnetic strength, magnet 115 is of a third magnetic strength, and magnet 113 is of a fourth magnetic strength, where the first strength is greater than the third strength, and the third strength is greater than the fourth strength. By providing fingernail edge adjacent to the first magnet pair 102, 113, and by ensuring that the magnetic attraction between the first magnet pair 102, 113 is less than the magnetic attraction between the second magnet pair 104, 115, this ensures that the cover 110 preferentially magnetically hinges open rather than moving uniformly away from the compartment 100, as shown in FIGS. 2a to 2f. It is to be noted that the magnetic hinging motion shown in FIG. 2 is bistable, in that the position of FIG. 2f shows a second stable position of the cover 110 relative to the compartment 100, due to the anti-parallel adjacent positioning of magnets 104 and 115. Thus, once the user hinges the cover 110 open to the position of FIG. 2f, the user can let go of the cover 110 and it will tend to stay in this position, freeing up the user's hands to do other tasks such as grasping the now-exposed battery 120, and reducing the chance of mislaying the cover 110.

In addition to providing a mechanism for holding and aligning the two parts, the use of four magnets with varying magnetic strength provides yet another dimension to this invention; manipulating the interaction/behaviour of the magnets. More specifically, by using magnets of varying magnetic strength the connection/disconnection behaviour of the two parts can be pre-defined. The proposed configuration results in a specific desired behaviour in the way the two parts connect, disconnect and even partially connect/disconnect. A first aspect of this is illustrated in the magnetically hinging motion of the battery cover shown in FIGS. 2a-2f.

Figure 3A:
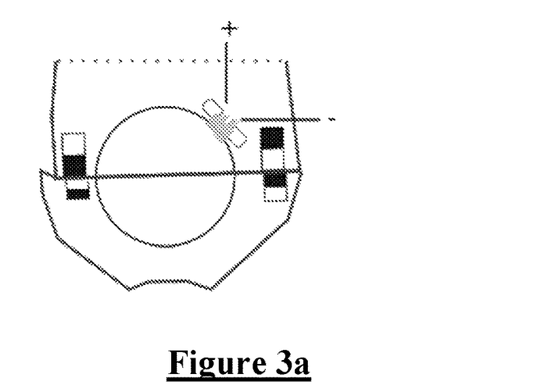
FIGS. 3a-3f illustrate a process for magnetically removing a battery from the battery compartment of FIG. 1.
Figure 3B:
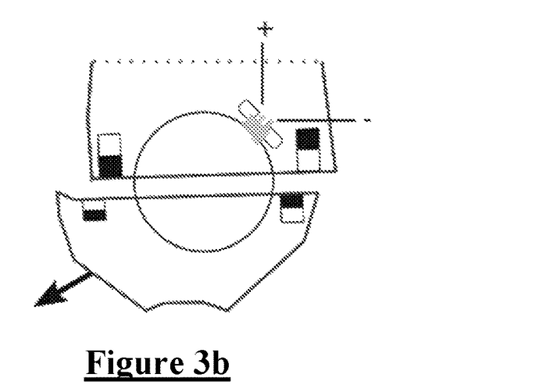
Figure 3C:
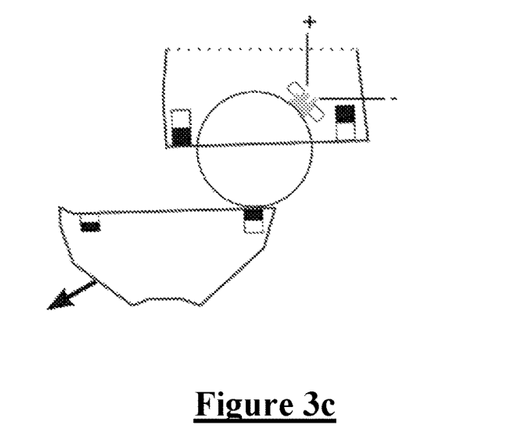

FIGS. 3a-3f illustrate another mode of use of the cover 110, specifically a process for magnetically removing a battery from the battery compartment of FIG. 1. In this mode of use, the cover 110 is first removed from the compartment 100. Next, as shown in FIG. 3c, the magnet 115 of the cover 110 is placed onto the exposed battery in order to magnetically capture the battery. Notably, this gives the user the means to withdraw the battery from the cavity without needing to grasp the relatively small battery, instead allowing the user to grasp only the relatively larger cover 110.

Figure 3D:
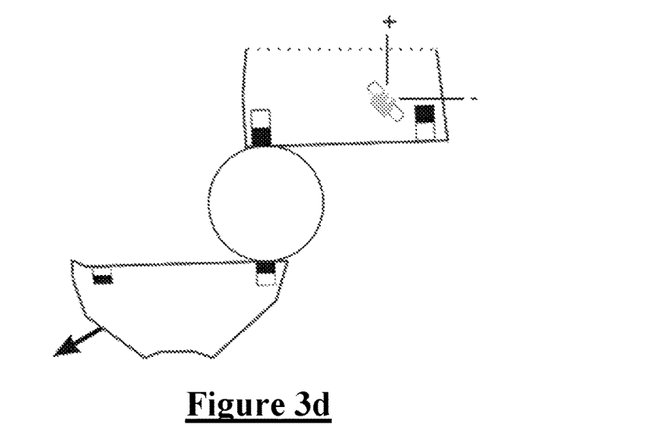
Figure 3E:
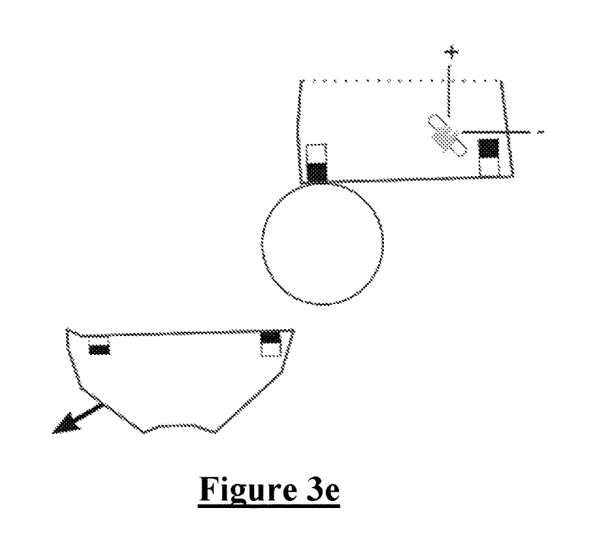
Figure 3F:
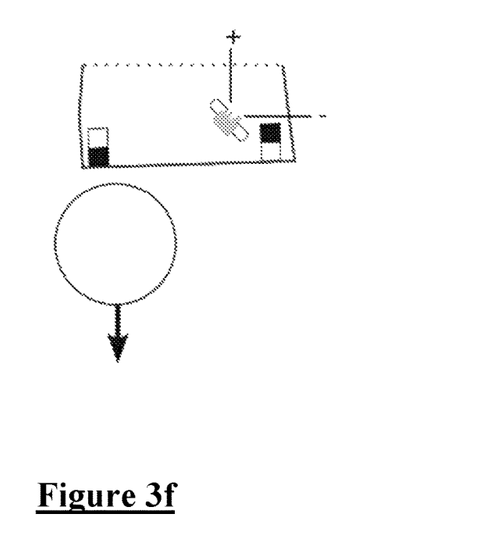
Figure 4A:
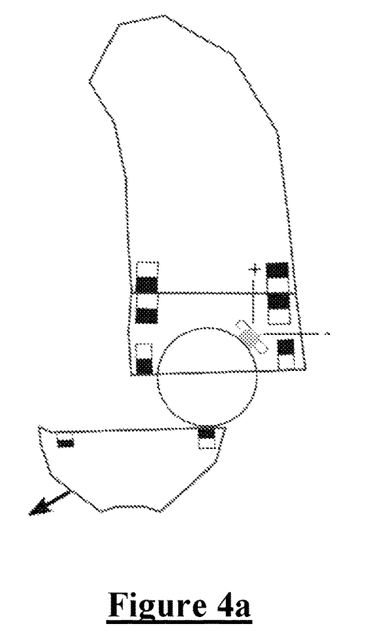
FIGS. 4a-4d illustrate a process for magnetically removing a battery from a modular battery compartment magnetically mounted to a hearing aid body.
Figure 4B:
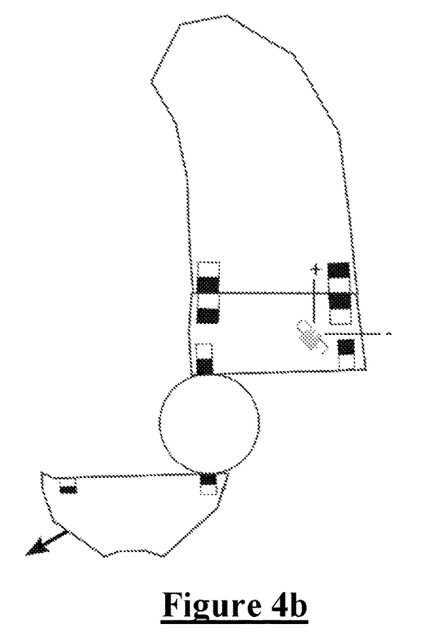
Figure 4C:
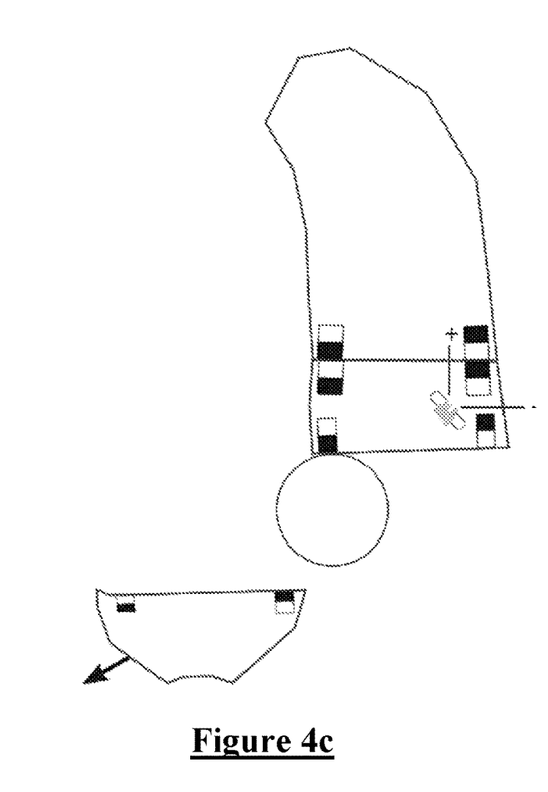
Figure 4D:
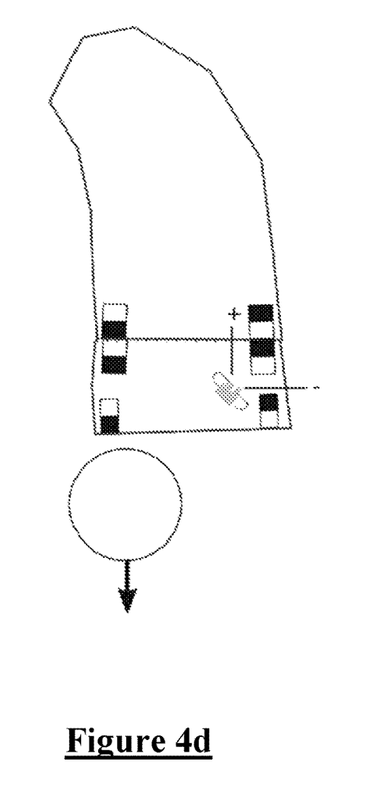

As shown in FIG. 3d, the user then further withdraws cover 110 so as to manipulate the battery out of the cavity and so that the battery takes up a position upon magnet 102. As noted above magnet 102 is stronger than magnet 115 so that when the cover is withdrawn further as shown in FIG. 3e, the battery remains upon magnet 102 and does not travel away with the cover 110. The user can then place the cover in any suitable location and without letting go of the hearing aid with a first hand can use their second hand to remove the battery as shown in FIG. 3f.

A second aspect of the use of variable magnet strength is show in the battery removal motion shown in FIGS. 3a-3f. In this figure it can be observed that by making the magnetic strength of magnets 115 and 113 sufficiently smaller than magnets 102 and 104 has the result that the battery 120 will preferentially remain attracted by magnets 102 or 104. The benefit derived from this scenario is that the user can change the batteries of his hearing aid without letting go of the main body of the hearing aid. Similarly to the application of magnets with differing polarity, the use of magnets with varying magnetic strength also provides benefit in the design for manufacturing and manufacturability of the device.

It should also be noted that in certain applications it may be beneficial and desirable to use magnets of equal physical sizes but varying magnetic strength to achieve an equivalent behaviour/overall outcome. Such application could be to ease manufacturability. Such alternative embodiments are within the scope of the present invention.

FIGS. 4a-4d illustrate a process for magnetically removing a battery from a modular battery compartment magnetically mounted to a hearing aid body.

FIGS. 5a-5d illustrate other modular functions of a hearing aid in accordance with the embodiment of FIG. 4. Like reference numerals indicate like features from preceding embodiments and are not described further. Compartment 100 is further provided in this embodiment with compartment mounting magnets 513 and 515, and the hearing aid body 500 is provided with body magnets 502 and 504. Magnet 502 is mounted with opposite (anti-parallel) polarity to magnet 504, to effect a single correct position and thus auto-alignment of compartment 100 upon body 500. The net magnetic attraction holding compartment 100 to body 500 exceeds the net magnetic attraction holding cover 110 to compartment 100, thus ensuring that a user grasping the cover 100 with intentions of removing the cover 110 will not also remove the compartment 100 from the body 500. The net magnetic attraction holding compartment 100 to body 500 is achieved by providing that the strength of each one of magnets 502, 504, 513 and 515 exceeds the strength of any one of magnets 102, 104, 113 and 115. Further, the respective strengths of magnets 502, 504, 513 and 515 are all equal in this embodiment.

Figure 5A:
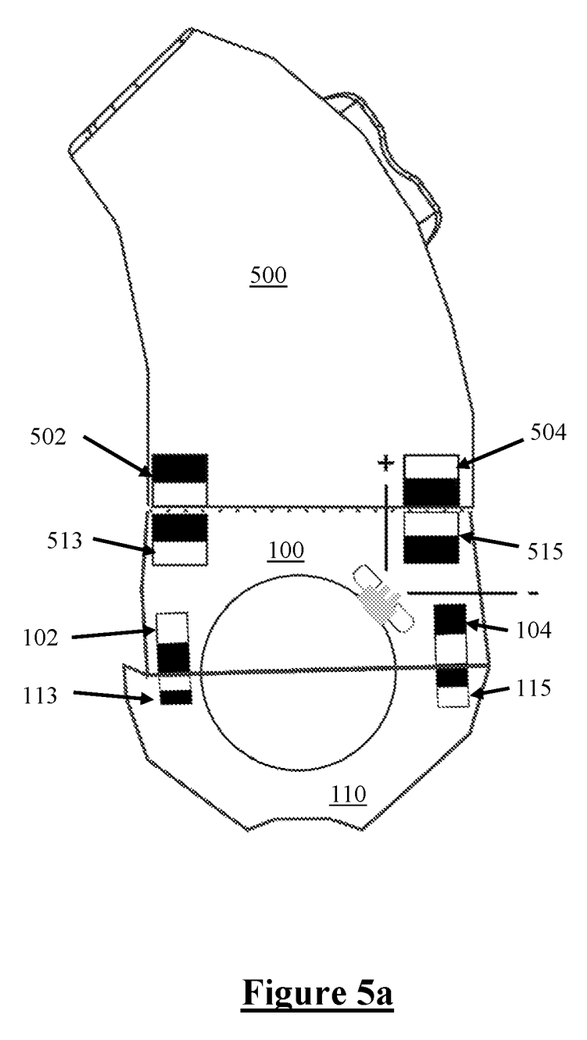
FIGS. 5a-5d illustrate other modular functions of a hearing aid in accordance with the embodiment of FIG. 4.
Figure 5B:
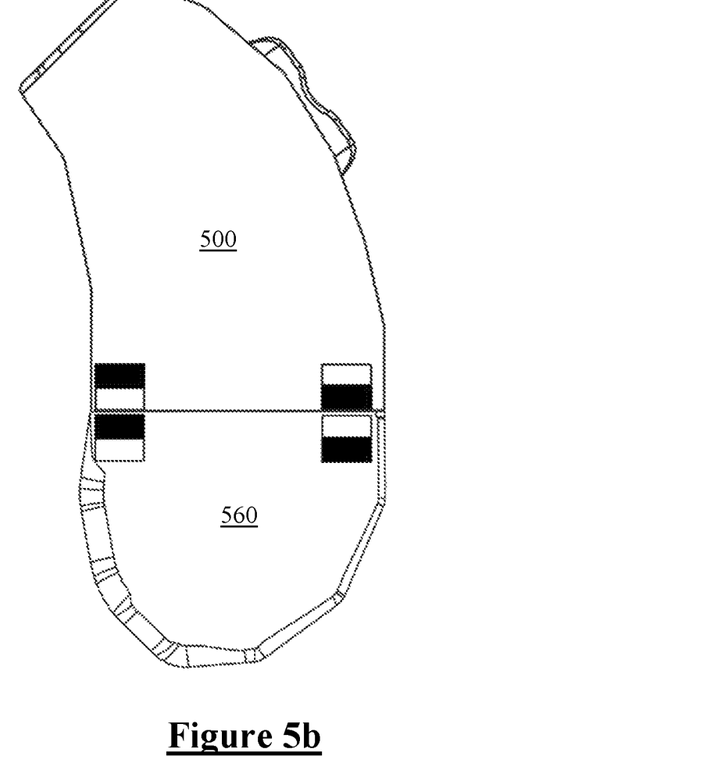
Figure 5C:
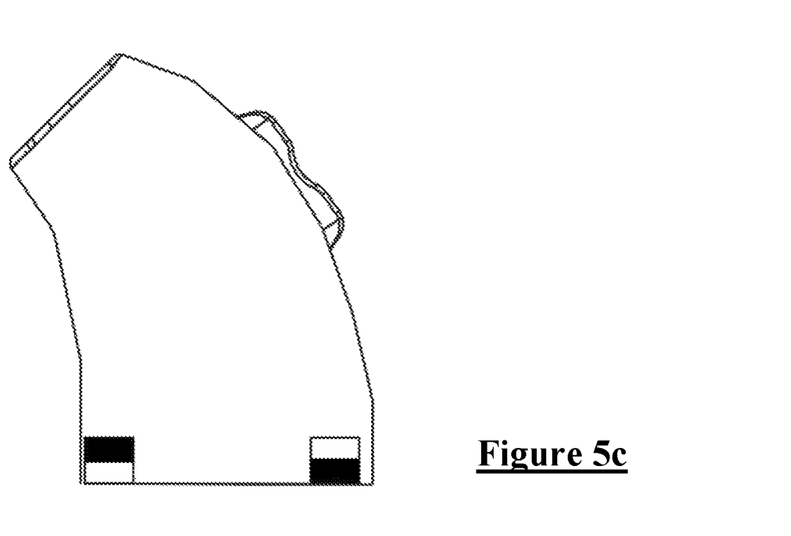
Figure 5D:
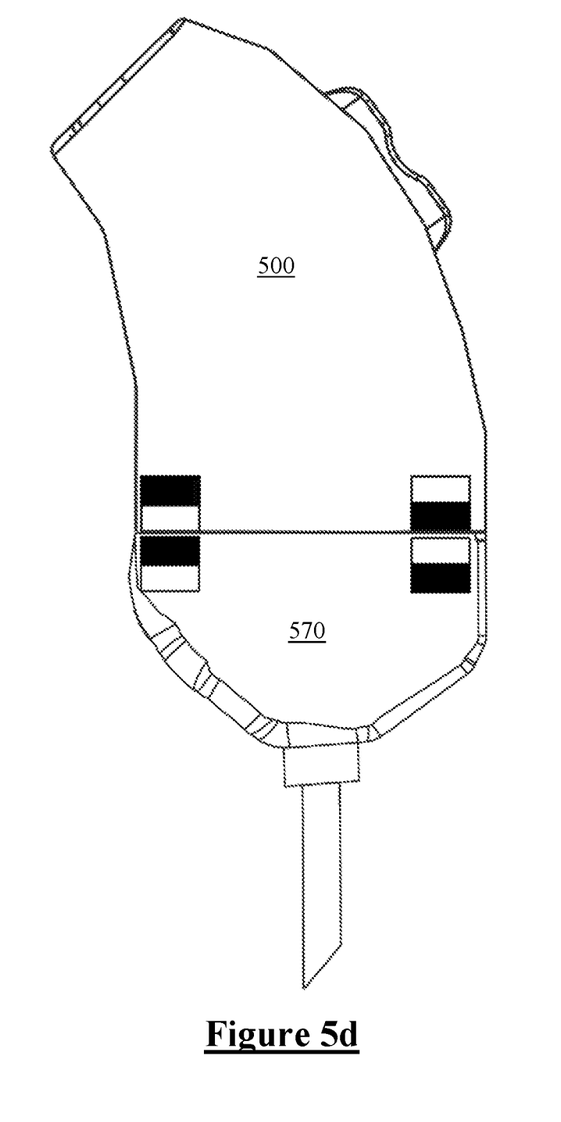

In FIG. 5a, the body 500 is provided with battery power by magnetically securing compartment 100 and cover 110 to the body 500. However, by providing for modular interchangeability via magnets 502 and 504, the present embodiment at other times may have the battery compartment 100 removed from the body 500, and the body 500 may instead be magnetically interfaced via magnets 502 and 504 with alternative replaceable modules, including but not limited to any one or more of: a module 560 (FIG. 5b) having a fixed cover, which may contain a single use battery, a rechargeable battery and/or a wireless data connector, a programmer cable connection 570 (FIG. 5d), a storage dock for storing the body 500 when not in use, or the like.

Figure 6:
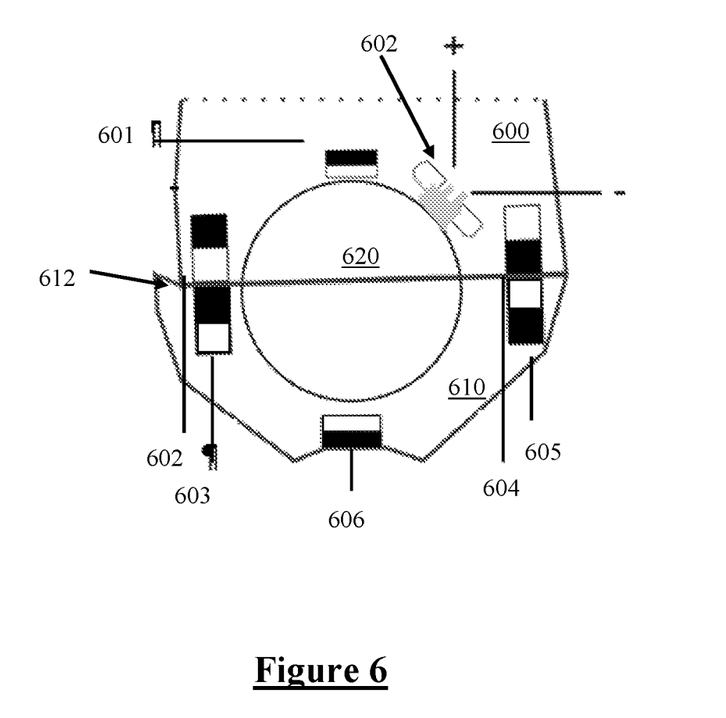
FIG. 6 is a cross sectional view of a battery cover and hearing aid body in accordance with a further embodiment of the present invention.

FIG. 6 is a cross sectional view of a battery cover and hearing aid body in accordance with another embodiment of the present invention. The described embodiments provide a magnetic replaceable battery compartment for a hearing aid. More specifically, a modular battery case to store and facilitate connection between the hearing aid and a replaceable battery is presented. The different parts of the compartment are to be held together by one or more magnets.

The magnetic replaceable battery compartment holds the battery, which provides electrical power to the hearing aid circuitry. In accordance with the present invention the compartment also allows for easy access to replace the battery once it has discharged. Notably, this design improves on existing battery compartment designs by simplifying the compartment opening mechanism, improving robustness and longevity of the battery compartment, increasing battery usability and freeing up space and/or design freedom within the hearing aid.

The battery compartment is formed by a hearing aid body 600 and a battery cover 610. The body 600 and cover 610 are held together by magnetic attraction between two pairs of permanent magnet restraint elements (magnets 602, 603 and 604, 605 in FIG. 6). The magnet pair 602-603 has reverse polarity to magnet pair 604-605, so that the cover self-aligns and so as to guide correct mating with the hearing aid body, as well as to use magnetic repulsion to prevent incorrect mating if the cover 610 is introduced in the opposite alignment to that shown.

FIG. 6 shows the cover 600 held in place during normal hearing aid operation, with the constant attractive force provided by magnets 601-605, and the repulsive force from magnet 606, combining to ensure that the battery 620 maintains constant firm contact with the electrical contacts 602 to power the hearing aid.

Figures 7A, 7B:
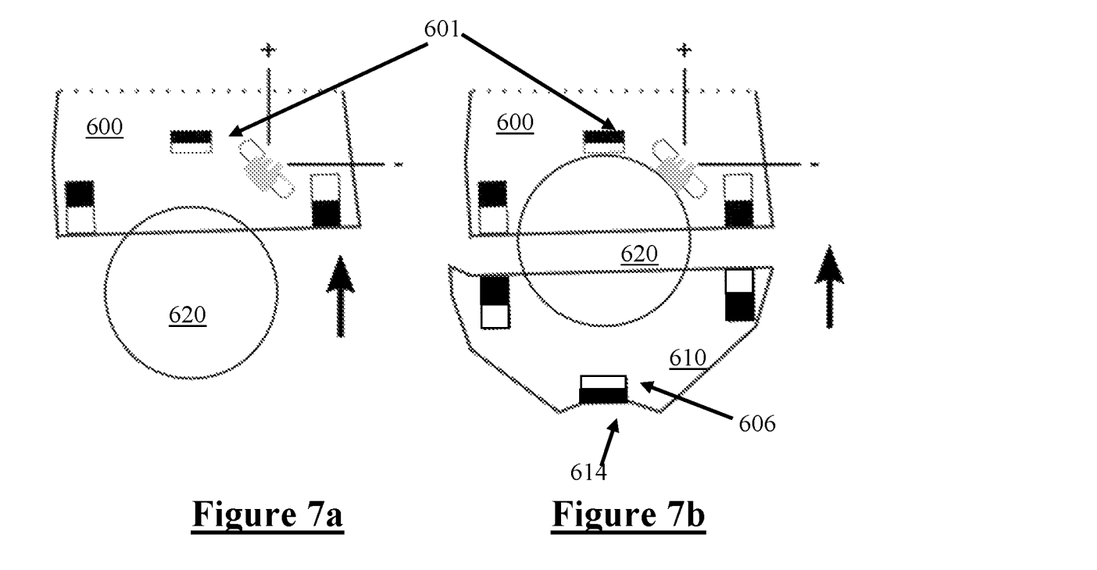
FIG. 7 illustrates insertion of the replaceable battery into the compartment of FIG. 6.

FIG. 7 illustrates the manner in which the present embodiment facilitates easier insertion of the replaceable battery into the compartment. Magnet 601 attracts the battery 620 as it is inserted in the manner shown in FIG. 7*a*, and will thus help guide and align the battery 620 during insertion. The battery in this and other described embodiments herein may comprise one of the typical hearing aid battery sizes (namely sizes 13, 312 or 675), or an alternative size of battery. The battery 620 may be inserted while being held between a user's fingers, or may be inserted on the back of the cover 610 in the opposite motion to that shown in FIG. 8. If the battery is inserted on the back of the cover 610, then once the battery is in place the battery cover can be dislodged from the battery to leave the battery in place, for example by moving the cover 610 in a sideways or shearing motion to break the magnetic attraction of the magnet 606 and leave the battery held by weaker magnet 601. Once the magnet 620 is held in the compartment by the magnet 601, the cover 610 can be placed over the battery 620 as shown in FIG. 7*b*, to thereby close and seal the battery compartment. It is to be noted that the relative repulsion applied by magnet 606 in this position is overcome by the strength of attraction of magnets 602-605, so that the net effect is to hold the battery cover 610 firmly against the body 600. The relative repulsion between magnet 606 and the battery 620 is also weakened by the increased distance between them with the cover 610 in this orientation.

Figure 8A:
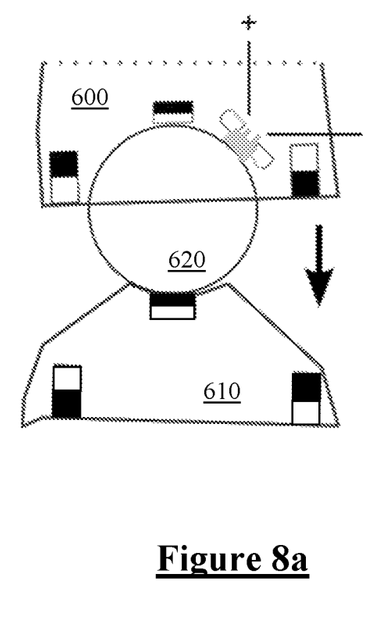
FIG. 8 illustrates removal of the replaceable battery from the compartment of FIG. 6.
Figure 8B:
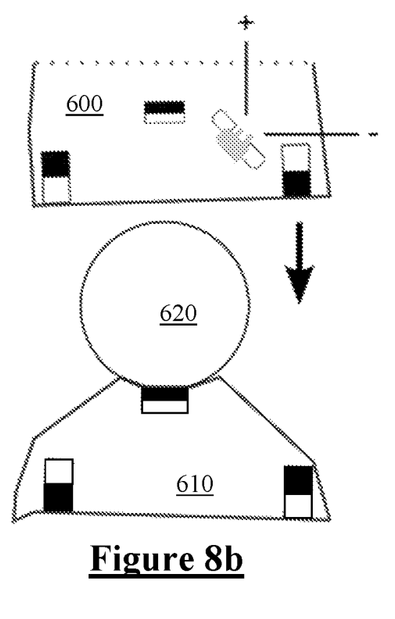

FIG. 8 illustrates the manner in which the present embodiment facilitates easier removal of the replaceable battery 620 from the compartment. The user grasps the cover 610 and detaches it from the hearing aid body by overcoming the magnetic attraction of magnets 602-605. A fingernail edge 612 is provided on cover 610 to assist, however alternative embodiments may simply rely on the user grasping the entire cover 610 without providing edge 612. In this orientation, the magnet 606 magnetically repels the battery 620, and magnet 601 attracts the battery 620, so that the battery 620 is urged to remain within the hearing aid body 600 after the cover 610 has been removed.

Next, as shown in FIG. 8*a*, the user rotates the cover 610 by 180 degrees, to reverse the magnetic field applied by the magnet 606 to the battery 620, from repulsion to attraction. The cover 610 is then brought close to the battery and the attraction of magnet 606 overcomes the attraction of magnet 601, so that withdrawing the cover 600 also withdraws the battery 620 from the body 600. Thus, the user does not need to grasp the battery 620 with their fingers in order to remove the battery from the body 600.

To help reliable removal of the battery 620, the cover 610 is provided with a battery stabilising groove or notch 614 in the outside surface of the cover 600, into which the battery 620 nestles when being removed so that the battery 620 is less likely to be dropped onto the ground and lost when being removed.

The battery 620 is then removed from the hearing aid body 600 as the user simply withdraws the cover 610 away from the hearing aid body 600, with the battery 620 magnetically attached under the attraction of magnet 606 to the exterior of the cover 610. The user completes all of these steps while grasping the (relatively large) cover 610 and does not need to grasp the (relatively smaller) battery 620 at any time during these steps. Nor does the user need to manipulate any hinged parts or sliding drawers.

It is to be noted that in alternative embodiments the battery cover may not be convex and for example the battery cover may comprise a planar element. In such embodiments the "inside" surface of the cover is defined as being the side of the cover which repels a battery, while the "outside" of the cover is defined as being the side of the cover which attracts the battery, and such embodiments are within the scope of the present invention.

Moreover while the described embodiment of FIG. 6 comprises a battery stabilising recess 614 in the outside surface of the battery cover 610, alternative embodiments may omit such a recess and may instead simply allow the attraction of the battery controlling magnet 606 to retain the battery 620 against the outer surface of the battery cover 610.

Thus, the use of magnets 602-605 means that the battery compartment opening mechanism is simplified considerably and in particular there are no hinged or sliding parts. Moreover, the simplicity of magnets allows for easy access to replacing the battery even for people with lower dexterity such as the elderly who tend to be a large user group of hearing aids. Further, the use of magnets in the described manner provides considerable space saving as compared to battery drawer sliding shell arrangements. Using magnets eliminates the need for a separate sliding shell as well as eliminating the need for a battery cover hinge. Yet another benefit of the use of magnets is that, unlike a battery drawer arrangement, in the present embodiments the battery can be placed far away from the outer surface of the device because the battery needs to be accessible only once the cover 610 and body 600 are separated.

Yet another advantage of the present embodiment is that, in contrast to the fine tolerances required in battery drawer arrangements, magnets with contrasting polarisation attract (induce force in) each other in a potentially large field around them. Therefore, using magnets means that as long as the magnetic field produces a force strong enough to hold the connector in place, the compartment will function well and does not require fine tolerancing such as the tolerance of the connector's plastics. This in turn makes the connector more manufacturable. Moreover, the use of magnets overcomes the problem of mechanical fragility of a battery drawer and cover hinge, by eliminating any movable parts and allowing for the battery compartment walls to form a thicker shell which overall allows for a more robust construction. Using magnets with reverse polarity provides substantial benefits to the manufacturability of the devices. The benefits of auto-alignment described in the preceding also apply to the manufacturing process in a similar fashion, as a manufacturing jig can be used as one part of the connector while the user in this scenario is the technician or manufacturing staff It is to be understood that, in addition to processing microphone signals, the processor in many embodiments will also be configured to process and/or output different signals as is typical for hearing aids. Examples of this are Telecoil signals, Bluetooth signals and serial signals, any or all of which may be processed in addition to the signals from the microphones, to refine device operation and/or for delivery to a respective ear of the user.

Some embodiments of the invention may utilise 3D printing for construction of some elements. Accordingly, in some embodiments the present invention may reside in a digital blueprint comprising a digital file in a format configured for use with rapid prototyping and computer aided design (CAD) and/or manufacturing, such as being in the STL (stereolithography) file format. Such digital blueprint files, whether produced by performing a three dimensional scan of an embodiment of the invention, or produced by a CAD development software tool, or the like, are within the scope of the present invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A battery cover for a hearing device, the battery cover comprising:
   at least two cover restraint elements, the cover restraint elements configured to magnetically cooperate with at least two respective battery compartment restraint elements in order to magnetically hold the battery cover against the battery compartment so as to define a battery cavity between the battery cover and the battery compartment,
   wherein the battery cover in use is selectively wholly separable from the battery compartment;
   wherein the cover restraint elements are positioned about the battery cavity so as to magnetically urge the battery cover to a preferred position relative to the battery compartment,
   wherein at least one of the cover restraint elements and body restraint elements comprises a permanent magnet; and
   wherein a magnetic strength of a first of the two restraint elements differs from a magnetic strength of a second of the two restraint elements.

2. The battery cover of claim 1 wherein the restraint elements are mounted on the cover such that a magnetic alignment of the permanent magnet restraint elements enforces correct alignment of the cover against the hearing device body when the battery cover is in place.

3. The battery cover of claim 1 wherein the cover restraint elements and the body restraint elements are mounted with non-parallel and non-rotationally symmetrical magnetic axes.

4. The battery cover of claim 3 wherein the cover restraint elements and the body restraint elements are mounted with anti-parallel magnetic axes.

5. A hearing device comprising:
   a device body carrying a hearing device processor for processing microphone signals to produce an output acoustic signal for delivery to a respective ear of a user,
   a battery compartment for containing a battery to power the processor, and battery compartment bearing at least two battery compartment restraint elements; and
   a battery cover bearing at least two cover restraint elements respectively configured to magnetically cooperate with the at least two battery compartment restraint elements in order to magnetically hold the battery cover against the battery compartment so as to define a battery cavity between the battery cover and the battery compartment,
   wherein the battery cover in use is selectively wholly separable from the battery compartment;
   wherein the cover restraint elements are positioned about the battery cavity so as to magnetically urge the battery cover to a preferred position relative to the battery compartment,
   wherein at least one of the cover restraint elements and body restraint elements comprises a permanent magnet; and
   wherein a magnetic strength of a first of the two cover restraint elements differs from a magnetic strength of a second of the two cover restraint elements.

6. The device of claim 5 wherein a subset of the restraint elements comprise permanent magnets.

7. The device of claim 5 wherein the restraint elements are mounted on the cover such that a magnetic alignment of the permanent magnet restraint elements enforces correct alignment of the cover against the compartment when the battery cover is in place.

8. The device of claim 5 wherein the cover restraint elements and the body restraint elements are mounted with non-parallel and non-rotationally symmetrical magnetic axes.

9. The device of claim 8 wherein the magnets are mounted with anti-parallel magnetic axes.

10. The device of claim 5 wherein unequal magnetic strength is provided by providing first and second magnets on the battery compartment of substantially equal first strength, and providing third and fourth magnets on the battery cover of respective third and fourth strengths, wherein the first strength is greater than the third strength, and the third strength is greater than the fourth strength.

11. The device of claim 5 wherein the battery compartment is a separate module to a body of the hearing aid device, and wherein the battery compartment in use is selectively wholly separable from the body of the hearing aid device, and wherein the battery compartment is magnetically held to the body of the hearing aid by at least one battery compartment mounting magnet and at least one hearing aid body magnet.

12. The device of claim 11 wherein a magnetic force holding the battery compartment to the hearing aid body is greater than a magnetic force holding the battery cover to the battery compartment.

13. The device of claim 11 wherein two pairs of magnets are provided to hold the battery compartment to the hearing aid device body.

14. The device of claim 13 wherein each pair of magnets provided to hold the battery compartment to the hearing aid device body are configured with differing or opposite polarity in order to provide an auto-alignment of the battery compartment upon the hearing aid device body.

15. The device of claim 5 wherein the battery compartment is integrally formed with the hearing aid device body.

16. A hearing device comprising:
   a device body carrying a hearing device processor for processing microphone signals to produce an output acoustic signal for delivery to a respective ear of a user,
   a battery compartment for containing a battery to power the processor, and battery compartment bearing at least two battery compartment restraint elements; and
   a battery cover bearing at least two cover restraint elements respectively configured to magnetically cooperate with the at least two battery compartment restraint elements in order to magnetically hold the battery cover against the battery compartment so as to define a battery cavity between the battery cover and the battery compartment,
   wherein the battery cover in use is selectively wholly separable from the battery compartment;
   wherein the cover restraint elements are positioned about the battery cavity so as to magnetically urge the battery cover to a preferred position relative to the battery compartment,
   wherein at least one of the cover restraint elements and body restraint elements comprises a permanent magnet, and
   wherein unequal magnetic strength is effected between at least one magnet on the battery compartment and at least one magnet on the battery cover.

17. The device of claim 16 wherein the at least one magnet on the battery compartment is stronger than the at least one magnet on the battery cover, so that the battery is preferentially magnetically held onto the rim of the battery compartment by the battery compartment magnet when the battery cover is taken away.

\* \* \* \* \*